(12) United States Patent
Baarsch et al.

(10) Patent No.: US 7,406,927 B2
(45) Date of Patent: *Aug. 5, 2008

(54) COMPUTER-BASED ELECTRONIC LIVESTOCK WEIGHING SYSTEM

(75) Inventors: Robert G. Baarsch, Spring Valley, MN (US); Mark H. Jaeger, Mapleton, MN (US); Thomas K. Hiniker, Mankato, MN (US); Michael Lundgreen, Fairmont, MN (US)

(73) Assignee: Herdstar, LLC, LeRoy, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/555,005

(22) Filed: Oct. 31, 2006

(65) Prior Publication Data

US 2007/0056529 A1 Mar. 15, 2007

Related U.S. Application Data

(63) Continuation of application No. 10/858,779, filed on Jun. 2, 2004, now Pat. No. 7,129,423.

(60) Provisional application No. 60/475,624, filed on Jun. 4, 2003.

(51) Int. Cl.
*A01K 29/00* (2006.01)

(52) U.S. Cl. .................................. 119/842; 177/199

(58) Field of Classification Search ................. 119/842; 177/25.13, 199, 200

See application file for complete search history.

(56) References Cited

U.S. PATENT DOCUMENTS

| | | | | |
|---|---|---|---|---|
| 3,657,475 A | * | 4/1972 | Peronneau et al. | 178/18.05 |
| 4,138,968 A | * | 2/1979 | Ostermann | 119/842 |
| 4,558,757 A | * | 12/1985 | Mori et al. | 178/18.05 |
| 6,552,278 B2 | * | 4/2003 | Johnson | 177/134 |
| 6,805,078 B2 | * | 10/2004 | Zimmerman et al. | 119/842 |
| 2003/0056995 A1 | * | 3/2003 | Johnson | |
| 2003/0226522 A1 | * | 12/2003 | Thibault | |

* cited by examiner

*Primary Examiner*—Randy W Gibson
(74) *Attorney, Agent, or Firm*—Nawrocki, Rooney & Sivertson, P.A.

(57) ABSTRACT

A system for weighing a plurality of quadruped animals is for use in a pen confining the animals. The pen has at least first and second segregated spaces with a first one-way chute allowing animal passage from the second space to the first space. A weighing station is located within a passage having an entrance and an exit, and that allows animal passage from the first area to the second area. The weighing station includes a weighing platform within the passage over which an animal must pass when passing from the first to the second space. The weighing platform has inlet and exit scales that support the weighing platform adjacent to inlet and exit ends thereof, and provides inlet and exit weight signals. A controller receives the inlet and exit weight signals and uses them in an iterative process to determine the presence of a single animal on the weighing platform. Once that determination is made, the sum of the inlet and exit weight values is very likely to accurately provide the animal weight. The controller may also use the inlet and exit weight signals to control closing of an inlet gate to bar more than one animal at a time from the weighing platform. An animal sorting system can easily incorporate this weighing system to provide more accurate sorting.

9 Claims, 7 Drawing Sheets

COMPUTER-BASED ELECTRONIC LIVESTOCK WEIGHING SYSTEM

This is a continuation of application Ser. No. 10/858,779 filed on Jun. 2, 2004 now U.S. Pat. No. 7,129,423 which claims priority under 35 U.S.C. § 119 (e) (1), of provisional application Ser. No. 60/475,624, previously filed on Jun. 4, 2003 under 35 U.S.C. § 111 (b).

BACKGROUND OF THE INVENTION

1. Scope of the Present Invention

The present invention relates to the field of management of quadruped livestock such as pigs based on measured weight. More specifically, the present invention provides an apparatus and system for weighing livestock and provides the possibility for accurate sorting the livestock according to weight.

2. Background of the Prior Art

Livestock producers now feed the livestock in large automated facilities holding literally hundreds or thousands of animals. An important aspect of efficient livestock production is determining the weight of individual animals in a herd. Animals should be shipped for slaughter at their optimal weight. The animal may not grade as well as possible and feed wasting occurs if an animal is fed too long. If fed for too short a time, an animal may again not grade as well, and the chance to add valuable weight to the animal relatively cheaply at the end of the process is lost.

These considerations are pertinent in pork production. Pigs gain weight relatively quickly as a percentage of body weight. Weight gains vary substantially from pig to pig. A wrong guess as to weight for an individual pig can be costly when measured as a percentage of the selling price. In fact, estimates suggest that additional profit of at least $20.00 per pig is possible by carefully measuring individual pig weight and basing feed selection and shipping decisions on these weight measurements.

The present invention relates to an apparatus and system that can more accurately and reliably track weight changes in individual members a pig herd. This information allows producers to improve weight gain efficiency through sorting by weight for feed mixture and for selecting and scheduling pigs for shipping to slaughter.

Now, every animal weighing system has a way to control access to the weighing station so that only one animal at a time enters the station. Typically, the system has an inlet gate controlled by the system that closes when an animal has passed through the gate. The gate usually operates pneumatically or hydraulically.

To reduce the chance of more than one pig entering the weighing system at a time, the system must accurately sense when a single animal has passed through the gate, and only then close the gate. The gate should not close on the animal because that may agitate or annoy the animal, deterring the pig from again passing through the weighing system and affecting weight gain. Those familiar with livestock such as pigs know that unpleasant experiences with a particular area of the confinement space will train the livestock to avoid the area, resulting in fewer weighing events for the affected livestock.

Some current systems rely on a sensor such as an animal proximity sensor that initiate the closure of the inlet gate upon sensing an animal passing through the inlet gate. Others use an operator-programmed trigger weight on the weighing platform for this purpose.

Both of these systems have inherent problems. Either type of sensing element requires frequent adjustment during the growth of the animals in the herd to reliably sense presence of a single animal. Each may fail to work properly when there is a large variation in sizes or weights of pigs in the herd.

A further problem is simply that of reliability. Livestock pens are inherently dirty places with dust and corrosive manure and urine throughout. Livestock feeders now frequently wash the sites such as watering, feeding, and weighing stations where animals tend to congregate. The water spray during washing can easily damage sensitive electronic components of all kinds. Separate components for sensing animal presence in the weighing station simply provides one more potential failure point.

For accurate weight measurement, systems now typically use two weighing elements supporting the weighing platform as shown in FIGS. 2-4. One weighing element is at the inlet or entry point for inlet and another at the exit. Load cell 35 in FIG. 2 senses inlet point weight and load cell 36 senses exit point weight.

Current systems sum the two values provided by the load cells as the animal enters the weighing platform. The average for the sum a number of samples accurately indicates animal weight.

SUMMARY OF THE INVENTION

While weighing the animals in a herd, it is advantageous to sense the position of livestock on the weighing platform of an animal scale. Once the position sensing indicates that the animal is completely on the scale, one can infer that weighing the animal will be successful.

The present invention provides a weighing system with an Electronic Sense of Position (ESP) feature that uses the relative amounts of weight sensed on scales fastened at inlet and exit ends of the weighing platform to act as an animal position sensor. This feature is able to detect the position of a domestic animal such as a pig on a weighing platform and the movement of the animal onto and off the weighing platform.

The ESP feature enables proper operation of any gates controlling access to the weighing platform based on the position of the livestock, by detecting all four feet on the scale. The ESP feature detects livestock position by testing the weights at the inlet and exit of the weighing platform. The ESP feature also allows the sensed animal weight to be verified as accurate.

The present invention is usable with a system for sorting a herd of animals such as pigs based on a user-programmed weight. The system can also be used to log individual animal weights by a unique identification number as read from the animal's ear tag to allow tracking individual and group animal performance.

The system consists of an electronic controller, system software executed by the controller, an enclosed weighing platform with control panel and a pneumatic-controlled inlet gate and possibly an exit gate. A console with display and keypad and a radio frequency ear tag reader is customary as well.

The system software operates the scale by actuating the pneumatic gate or gates, weighing the animal, storing the data, and providing the user with the weights of the animals in the herd.

The user can accommodate the size of animals in the herd by adjusting the closing force and the speed of the inlet gate. This system eliminates the need to adjust animal sensors at the inlet gate. Setting an overweight limit perhaps 10% above the heaviest animal in the herd allows the system to detect two animals in the weighing station.

The system software makes a continuous log of the livestock group automatically. The log includes values such as lightest, heaviest, average, and total weights. It can also record the number of animals, standard deviation, and average daily gain from the previous day. In addition to the previous information, it can also display a histogram of the distribution of weights. This histogram is adjustable and gives the user the ability to zero in on marketing opportunities. The system can easily track death, sales, and other pig inventory changes.

The system software needs no preprogramming to collect information. Information logs automatically and is accessible later.

In one form, this system for weighing a plurality of quadruped animals is usable in a pen confining the animals. The pen has at least first and second segregated spaces with a first one-way chute allowing animal passage from the second space to the first space.

A weighing station is located within a passage having an entrance and an exit, and that allows animal passage from the first area to the second area. The weighing station includes a weighing platform over which an animal must pass when moving from the first to the second space.

The weighing platform has inlet and exit ends adjacent to the first and second spaces respectively. An inlet scale supports the weighing platform adjacent to the inlet end thereof, and provides an inlet weight signal encoding a value indicating the weight supported by the inlet scale. An exit scale supports the weighing platform adjacent to the exit end thereof and provides an exit weight signal encoding a value indicating the weight supported by the exit scale.

A controller receives the inlet and exit weight signals. In one embodiment the controller comprises a memory for storing values associated with weighing an animal as well as for storing object code for execution by the controller.

The controller has a calculation element receiving and recording the inlet and exit weight signals, calculating a plurality of parameters based on the inlet and exit weight signal, and encoding a scale weight value equal to the sum of values encoded in at least one inlet weight signal and at least one exit weight signal.

The controller also has a platform status element periodically executing an algorithm determining from the values encoded in the inlet and exit weight signals the presence of a single animal on the weighing platform, and responsive to said determination issuing a weight captured signal signifying that the scale weight value accurately specifies the weight of the animal on the scale.

A system sorting animals according to weight can incorporate this weighing system. This weighing system can allow a user to select a threshold weight from a histogram, or distribution of animal weights in a herd, when sorting the herd. The weighing system is compatible with software that can generate an approximation of the precise histogram based on the animals actually crossing the scale over time. The weighing system can associate weights with individual animal RFID tags.

This weighing system can rapidly and accurately weigh large numbers of animals. Not every animal crossing the weighing platform will be accurately weighed, although the percentage weighed successfully is likely to be upwards of 90%. However, the system is very successful at identifying weights likely to be inaccurate.

DESCRIPTION OF THE PREFERRED EMBODIMENTS

Figure 1:
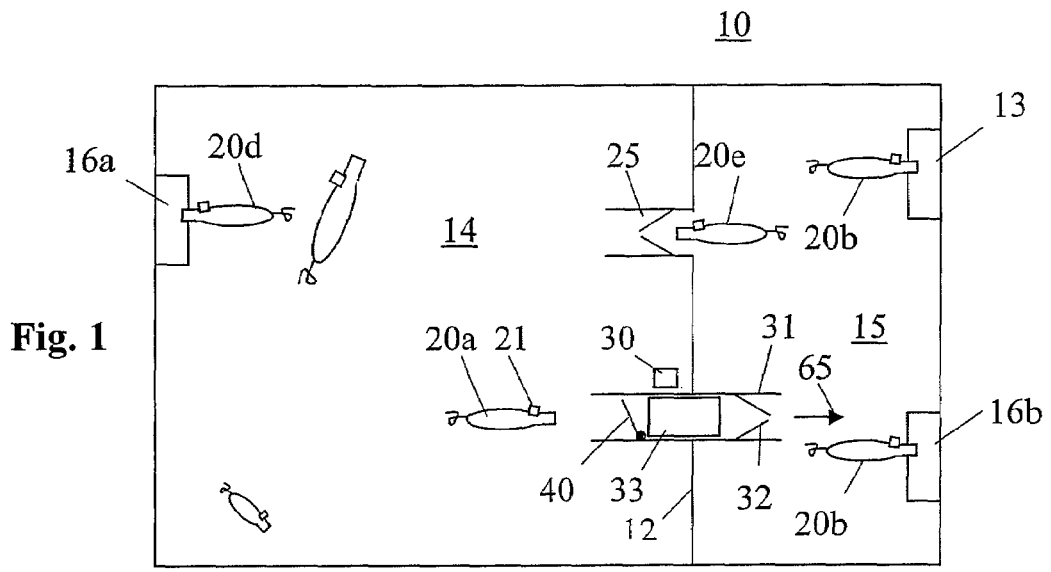
FIG. 1 shows a plat or plan (bird's eye) view of a representative animal pen in which the weighing station of the invention may be used.

FIG. 1 shows a representative barn or pen 10 for holding a plurality of animals to be fed for weight gain preparatory for slaughter. The animals in this example are shown as pigs 20a, 20b, etc., but the weighing system can be adapted to weigh individual animals in herds comprising a variety of quadruped livestock. The weights may vary substantially, or may all be reasonably similar. For a high percentage of successful weighing events, the animal weights should not have too great a range.

As pigs 20a, etc. grow, their weights will increase from as little as 30 lb. to as much as 300 lbs. (approximately 14 to 140 kg.) with their lengths increasing proportionately. This invention can easily handle such a wide range of weights and lengths. The user may need to make occasional adjustments as the animals 20a etc. grow to maintain a high percentage of successful weighing events.

Pigs 20a, etc. may have RFID tags 21 attached to the pigs 20a, etc. that uniquely identify the pigs 20a, etc. to which the tags 21 are attached. RFID tags 21 allow weights to be associated with individual pigs 20, etc.

A fence 12 divides pen 10 into a feeding (second) space 15 and a loafing (first) space 14. Feeding space 15 has both a water trough 16b and a feed trough 13. The loafing space 14 has a water trough 16a only, although this configuration may be changed to encourage animals to frequently move between spaces 14 and 15.

Pigs 20a, etc. can only pass from loafing space 14 to feeding space 15 through a passage 31 having a floor 28 (FIG. 2) above which a weighing station 33 is positioned. Panels form the sides of passage 31. Weighing station 33 includes a weighing platform 42 (FIGS. 2 and 3) on which a pig 20a must be standing or lying when recording its weight.

FIG. 1 shows an inlet gate 40 controlling animal entry to passage 31 and weighing station 33. Inlet gate 40 has a pneumatic actuator that operates gate 40 between open and closed positions. Gate 40 may have other types of actuators such as hydraulic or electrical.

Inlet gate 40 should be close to the inlet end of weighing platform 42. A typical gate 40 may have adjustable closing speed and force. Light pigs 20a (say 30-100 lb.) will require gate 40 to have a slower and less forceful closure than large pigs 20a. The industry is familiar with these factors.

The inlet gate 40 open position allows passage of a pig 20a from loafing space 14 to passage 31 and weighing platform 42. The inlet gate 40 closed position prevents passage of an animal between loafing space 14 and weighing platform 33. Inlet gate 40 shifts to the open position responsive to a first value of an inlet gate signal, and shifts to the closed position responsive to a second value of the inlet gate signal. The gate 40 actuator opens and closes gate 40 responsive to the inlet gate signal.

Figure 1A:
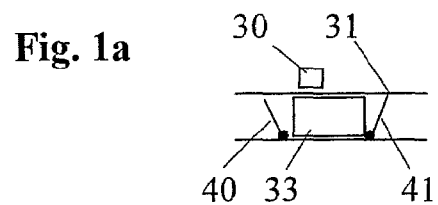
FIG. 1a shows an alternative structure for the exit of the weighing station.

In one form of this invention, pigs 20a, etc. leave weighing station 33 through a first one-way chute 32 that allows pigs 20a, etc. to easily pass from loafing space 14 to feeding space 15 but bars them from passing in the opposite direction. Alternatively, FIG. 1a shows an exit for passage 31 comprising an exit gate 41 whose operation is similar to that of inlet gate 40. Exit gate 41 shifts between open and closed positions responsive to first and second values of an exit gate signal.

Pigs can only reach the loafing space 14 from feeding space 15 through a second one-way chute 25 similar to one-way chute 32, and shown with a pig 20e about to enter chute 31. A number of commercially available one-way chutes 32 and 25 are suitable for this purpose.

Of course, more than one second one-way chute 25 may be used when larger numbers of animals 20a, etc. are housed in pen 10. The invention works optimally when animals 20a, etc. can move freely from space 15 to space 14.

Figure 2:
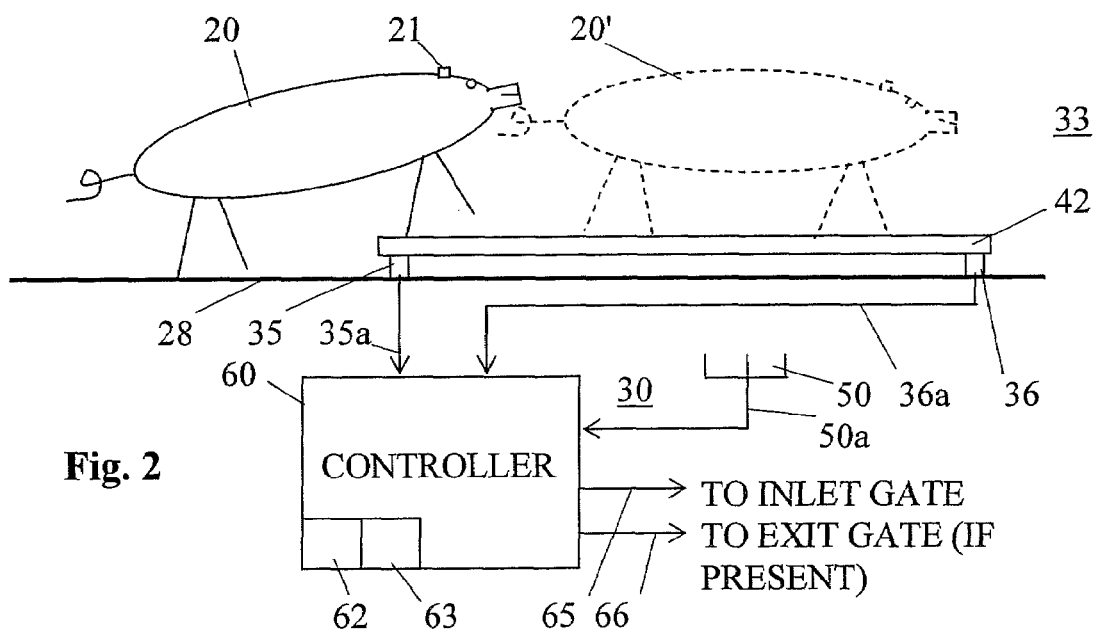
FIG. 2 is a side view schematic of the weighing station.

Normally, one expects a pig 20 to first step onto weighing platform 42 with one front hoof as shown in FIG. 2. After a time typically taking a few seconds but ranging from less than a second to tens of seconds, pig 20 moves to a second position 20' shown in phantom where all four hooves are on weighing platform 42.

Figure 3:
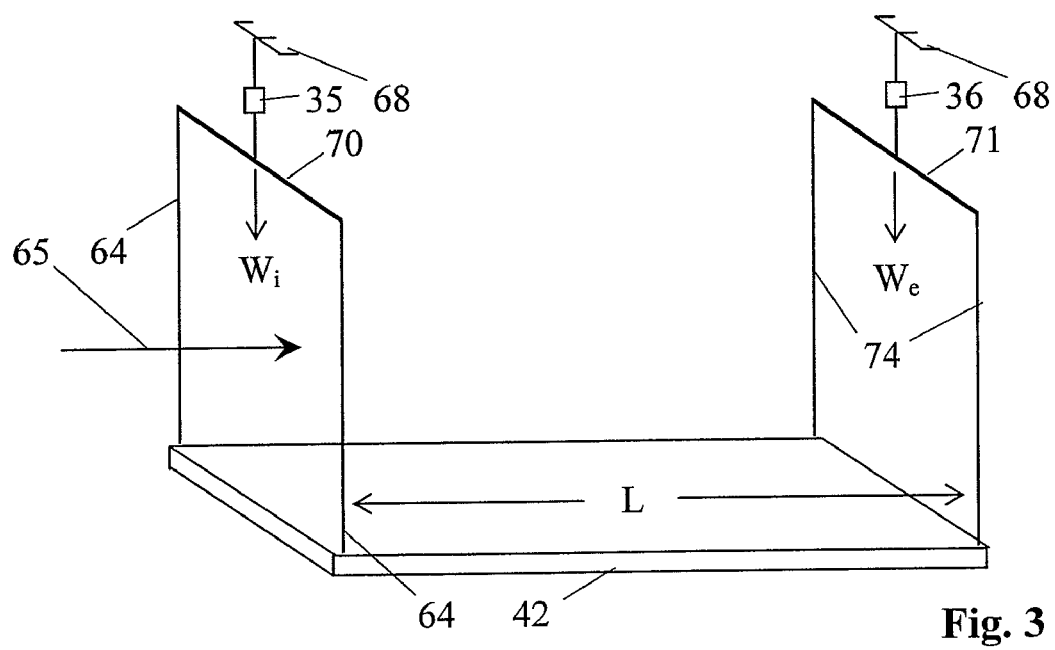
FIG. 3 is a perspective view of the weighing station.
Figure 4:
FIG. 4 is a side view labeling a weighing station dimension.

The weighing platform 42 shown in FIG. 3 is rectangular and hung from an inlet bar 70 and an exit bar 71 respectively by cables 64 and 74 separated by a distance L as shown in FIGS. 3 and 4. In a weighing system for pigs, L may be 4 ft. (1.2 m.). Platform 42 has an inlet end adjacent to loafing area 14 and an exit end adjacent to feeding area 15. An inlet load cell or scale 35 and an exit load cell or scale 36 suspend the respective bars 70 and 71 from an overhead support 68. Bars 70 and 71 may incorporate their respective in scales 35 and 36 as in integral component such as a strain gauge.

As seen in FIG. 2, inlet scale 35 and exit scale 36 provide inlet and exit weight signals on paths 35a and 36a that respectively encode weights $W_i$ and $W_e$ sensed by the scales 35 and 36. Arrow 65 in FIGS. 2 and 3 indicates the direction of pig 20a, etc. movement across weighing platform 42.

A controller 30 shown in FIG. 2 comprises a microprocessor mounted within a housing with multiple I/O connections. Controller 30 is the control center of the system and receives the inlet and exit weight signals on signal paths 35a and 36a respectively. The circuitry of controller 30 includes a memory 62 for data and software storage and an analog-to-digital converter that translates the inlet and exit weight signals into usable digital values and stores these in the memory.

Controller 30 controls the position of gate 40 (and gate 41 if present) with gate signals carried on paths 65 and 66. An antenna 50 provides controller 30 with radio frequency ear tag signals on a path 50a.

The gate signals to gates 40 and (if present) 41 that controller 30 provides depend on the values of $W_i$ and $W_e$. Controller 30 samples the inlet and exit weight signals about every 100 ms. This frequent sample rate allows controller 30 to use changes in the individual values of $W_i$ and $W_e$ to estimate the position of pigs 20a, etc. on weighing platform 42 and determine when pigs 20a, etc. have all four hooves on platform 42.

The system software in controller 30 provides the algorithms and process control mechanisms for operating the system. The controller 30 uses operator-entered parameters to automatically collect and verify animal weight information.

A user console not shown, which can be remote from the controller 30, provides a means for an operator to view and enter data. Information transfers between the user console and the controller 30 through a communication cable. Operator settings entered at the user console are stored in memory 62.

Controller 30 may include an ear tag reader 63 capable of reading animal ear tags 21 with antenna 50 while the animals 20a, etc. are contained in passage 31. Upon receiving the ear tag information on path 50a, controller 30 automatically transmits the identification number recorded therein to memory 62 where the animal weight and other pertinent information can be stored with it.

One of the unique aspects of the invention is the closing of the inlet gate based on hog weight and position. This is made possible by sensing the inlet weight $W_i$ separately from the exit weight $W_e$ and calculating a number of parameters based on $W_i$ and $W_e$. $W_i$ and $W_e$ values are read separately in a multiple channel analog-to-digital converter.

Controller 30 uses the separate $W_i$ and $W_e$ values to calculate the location (position) of the center of mass of the pig 20a, etc. on the weighing platform 42. This enables the controller 30 to close the inlet gate 40 when the pig 20a has all four hooves on the weighing platform 42. Closing the inlet gate 40 prematurely will result in the animal being pinched, stressing the pig 20a, etc. and causing it to avoid passage 31, and hence rarely weighed.

The software of the present invention uses one of two detection schemes to trigger the closing of the inlet gate 40. Each of schemes initiate inlet gate 40 closure when pig 20a has the proper location on the weighing platform 42.

Scheme 1 monitors the pig entrance onto the weighing platform 42 by first detecting the front hooves on the weighing platform 42 and when detecting the back hooves on the weighing platform 42, triggers the gate closure. Detecting the front hooves separately from the back hooves is done without knowing actual pig position.

Scheme 2 uses pig weight and position to trigger the gate closure. A unique algorithm combines published information of pig body length versus body weight and front hoof weight versus body weight to provide the average front hoof weight versus body length. A lookup table was produced from this algorithm that associates the required pig position with the sensed pig 20a weight $W_i+W_e$. The internal software of controller 30 uses this lookup table to initiate the closure of inlet gate 40 when the pig position exceeds the look-up table trigger position for the pig 20a weight.

FIGS. 5-7b comprise software flowcharts that outline the logic of these detection schemes. The reader should be aware that these flowchart elements have physical manifestations in the patterns of the matter within memory 62 that record the object code for these software elements. In particular, various of the activity elements can set the inlet gate flag to values that control the inlet gate 40 position.

In general in the flowcharts of FIGS. 6a-7b, the decision elements, and the activity elements that set flags and acquire the $W_i$ and $W_e$ values, form a platform status element within controller 30. Activity elements that perform various arithmetic operations such as those in FIG. 5, form part of a calculation element within controller 30.

A software manager, not shown, coordinates the selection of routines for execution. Instruction execution generally starts at the "Animal Capture" entry point 100. The various routines of FIGS. 6a-7b run in an infinite loop with execution returning to entry point 100 when any number of different conditions are detected by the software execution.

Figure 5:
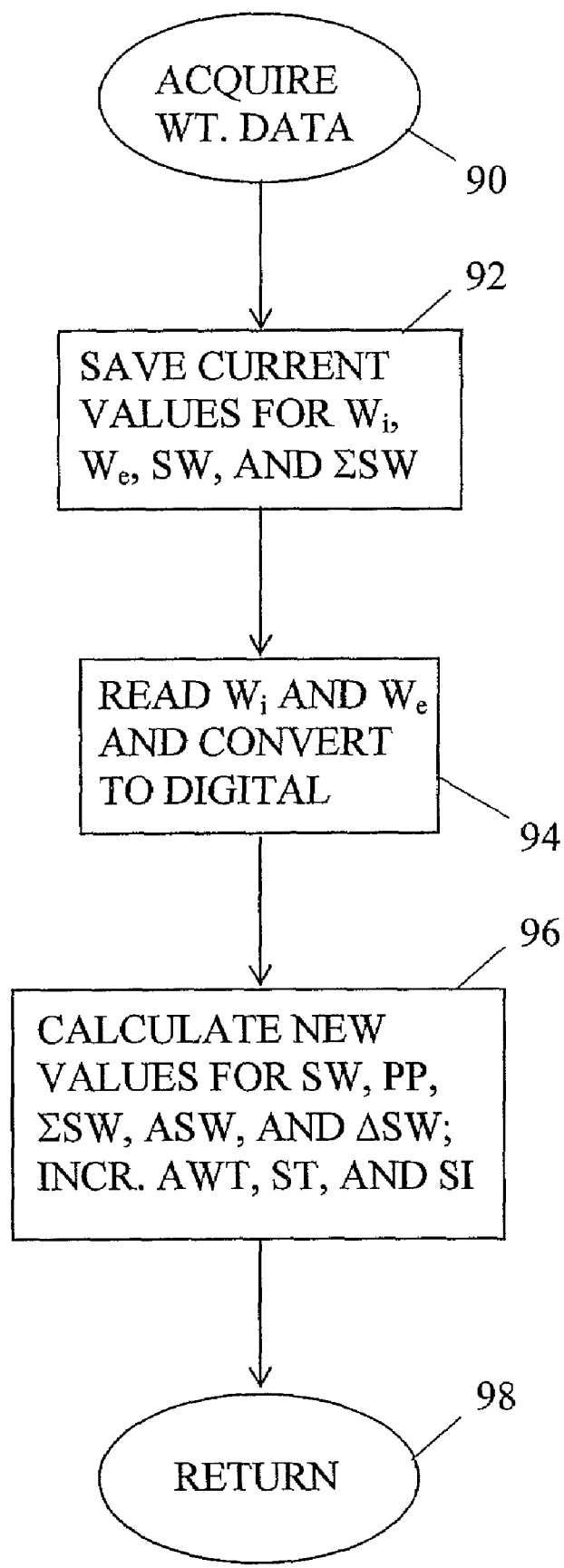
FIG. 5 is a flowchart of software whose execution by a microprocessor or other computer creates a calculation element that reads the $W_i$ and $W_e$ values and calculates a number of parameters based on these individual values.

With respect to the Acquire Weight Data (AWD) routine in FIG. 5 however, the software manager tracks elapsing time and at preselected intervals, transfers execution to the AWD routine. In one embodiment, the AWD routine executes every 95 ms.

The AWD routine shown in FIG. 5 reads the weight data $W_i$ and $W_e$ from scales 35 and 36 and computes a number of parameters based on the weight data. The AWD connector element 90 is the entry point to the AWD routine. The first component of the AWD routine is an activity element 92 that saves as the previous values, the current values of a Scale Weight value SW, a Scale Weight summation value ΣSW, the $W_i$ value, and the $W_e$ value in memory 62 locations for the previous SW, ASW, $W_i$, and $W_e$ values.

Next, activity element 94 instructions read the weight values encoded on paths 35a and 35b and convert them to current digital values $W_i$ and $W_e$. The current $W_i$ and $W_e$ values are then stored in the memory 62 locations for the current $W_i$ and $W_e$ values.

Then activity element 96 computes and stores in memory 62 a number of parameter values based on the $W_i$ and $W_e$ values. Element 96 calculates from the current values of $W_i$ and $W_e$, current values of SW=$W_i$+$W_e$; ΣSW value=previous ΣSW value+current SW; a ΔSW value=|current SW−previous SW|/previous SW; and a pig position (PP) value=$W_e$/SW. (An alternative $PP_a$ value=$W_i$/SW is not used in the flowcharts of FIGS. 6a-7b.) The PP value specifies the position of a pig 20a on weighing platform 42. The sense of various tests forming parts of the flowcharts of FIGS. 6a-7b must be changed if the $PP_a$ value is used.

Element 96 also increments an Average Weight Time (AWT) value and a Scale Timer (ST) value that indicate elapsed times from the time the AWT and ST values respectively were last cleared. Activity element 96 also computes a new value for a Scale Index SI=current SI+1, and computes an Average Scale Weight ASW=ΣSW/new SI. The ASW value is the actual average of SW's read since the ΣSW and SI values were last cleared.

Connector element 98 then returns execution to whatever point in the flowcharts of FIGS. 6a-7b the instruction execution was at when the AWD routine started execution. Typically, the animal weighing software returns execution to the software manager every 90-100 ms. or so to allow re-execution of the AWD routine to generate fresh weight values.

Figure 6A:
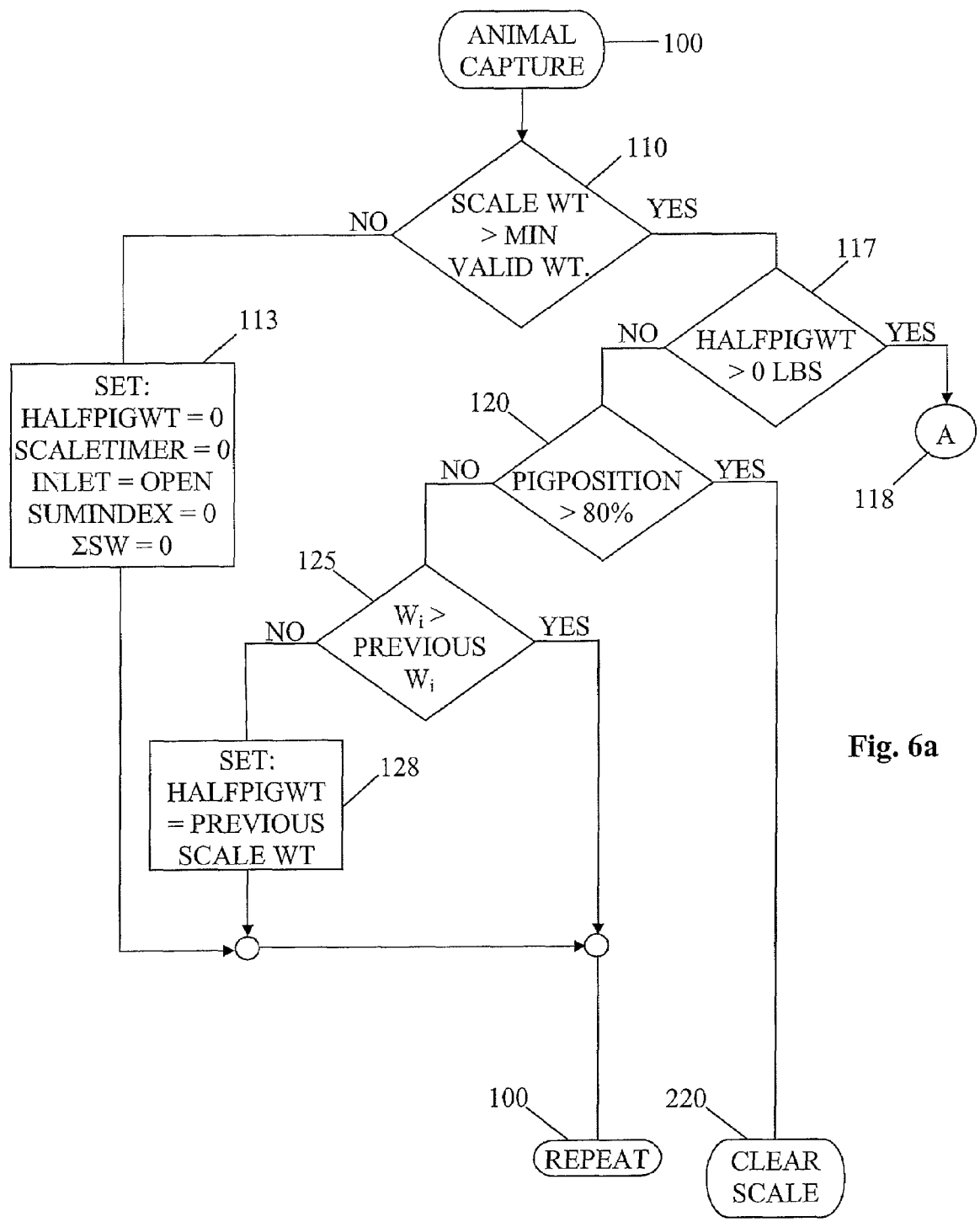
FIGS. 6a and 6b show a flowchart of software whose execution by a microprocessor or other computer forms part of a platform status element that senses animal position and prevents an animal on the weighing platform from leaving the weighing platform.
Figure 6B:
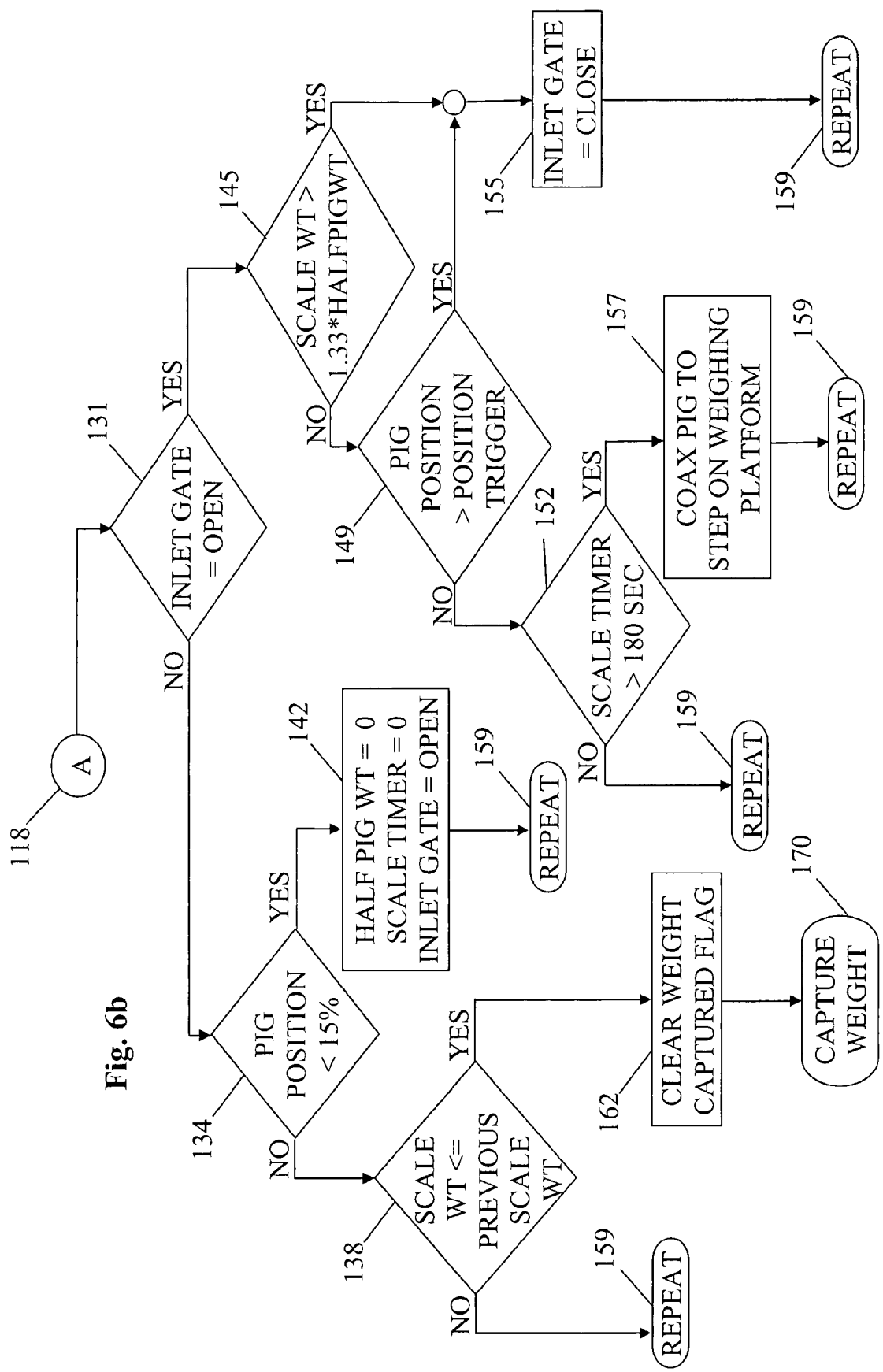

FIGS. 6a and 6b show the instructions executed for sensing a pig 20a, etc. moving onto weighing platform 42 and for closing inlet gate 40 when a pig 20a has progressed sufficiently onto weighing platform 42.

Decision element 110 tests the current SW value against an operator-entered Minimum Valid Weight value MVW. If SW is ≦MVW, element 110 directs instruction execution to activity element 113. Element 113 sets a Half Pig Weight parameter HPW=0 and a Scale Timer value ST=0. The ST value is periodically incremented automatically by the AWD routine.

Element 113 also sets an Inlet Flag IF to a first value. Controller 30 sets the inlet gate signal on path 65 to the IF value as well, whose first value commands inlet gate 40 to the open position. This of course allows a pig 20a, etc. to enter passage 31. Instruction execution then proceeds to the executive routine that restarts the Animal Capture routine at the next scheduled time.

Eventually a pig 20a, etc. will enter gate 40 and place at least one hoof on platform 42. The next time the Animal Capture software execution starts, decision element 110 detects that SW>MVW, and proceeds to next execute the instructions of decision element 117.

Decision element 117 tests if the HPW value >0. If so, then execution proceeds through connector element A 118 to decision element 131 in FIG. 6b. The first time this software executes after an animal 20a places its hooves on platform 42, the HPW value will still be 0 as set by activity element 113, so the execution proceeds to decision element 120.

Decision element 120 tests whether the PP value >80%. If so, this indicates that a pig 20a has forced its way through the exit chute 32 or the exit gate 41 the wrong way, or that only the rear hooves of pig 20a are still on the weighing platform 42, so a valid weighing is not possible. In this case, the execution proceeds through connector element 220 to the Clear Scale routine.

If PP≦80%, then the decision element 125 instructions execute next. Decision element 125 tests whether the current $W_i$ value >previous $W_i$ value. If true, then the Animal Capture software executes again. This means the pig 20a has just stepped on weighing platform 42.

If not true, this means the pig 20a has taken another step forward on the weighing platform 42, transferring weight from scale 35 to scale 36, but has not yet stepped onto the weighing platform 42 with either rear hoof. In this case, activity element 128 sets the HPW value to the value of the SW calculated by the previous execution of the AWD routine, and the Animal Capture routine executes again. This next execution of the Animal Capture routine finds decision element 117 directing execution to decision element 131 since the HPW value>0.

Turning next to FIG. 6b, decision element 131 tests whether the Inlet Flag IF has its first value. If yes, this means that inlet gate 40 is open, and the instructions for decision element 145 are executed next.

Decision element 145 instructions test whether current SW>1.33 HPW. If true, this means that a pig 20a has both front hooves and at least one back hoof on weighing platform 42. The IF is set to the second (inlet gate 40 closed) value to prevent another pig 20b from entering passage 31 and the pig 20a within passage 31 from backing off weighing platform 42. Next, the Animal Capture routine is re-executed. If SW>1.33 HPW is untrue, the instructions for decision element 149 execute.

Decision element 149 uses the following Position Trigger (PT) table. Use of the PT table provides an alternative basis for making the decision to close the inlet gate 40.

The PT table specifies for the current SW value a current PP value that very nearly guarantees that inlet gate 40 can be closed without hitting the pig 20a with gate 40 in a way that may disturb it. The PT table following has values for feeder pigs, but other tables for other types of quadrupeds can be developed. The entries in this PT table are based on measurements of actual pig size and weight.

POSITION TRIGGER TABLE

| Scale Weight | Position Trigger |
|---|---|
| 0-15 | 26 |
| 16-31 | 27 |
| 32-47 | 30 |
| 48-63 | 33 |
| 64-79 | 36 |

-continued

POSITION TRIGGER TABLE

| Scale Weight | Position Trigger |
|---|---|
| 80-95 | 39 |
| 96-111 | 41 |
| 112-127 | 43 |
| 128-143 | 44 |
| 144-159 | 45 |
| 160-175 | 45 |
| 176-191 | 31 |
| 192-207 | 32 |
| 208-223 | 33 |
| 224-239 | 33 |
| 240-255 | 34 |
| 256-271 | 35 |
| 272-287 | 36 |
| 288-303 | 37 |
| 304-319 | 37 |
| 320 and up | 38 |

Decision element 149 selects the PT value from the PT table corresponding to the current SW value. If the current PP value is >the selected PT value, it is very likely that the animal 20a has cleared inlet gate 40. The decision element 149 provides an alternative basis for closing inlet gate 40. If the decision element 149 test is satisfied, the instruction execution proceeds to activity element 155 as with decision element 145.

If the decision element 149 test is not satisfied, the decision element 152 executes, testing the ST value. If the ST value is greater than 180 sec., controller 30 executes a coax function to urge the pig 20a to step onto the scale. A number of different operations beyond the scope of this invention may comprise the coax function. Then the Animal Capture routine is re-executed.

If the decision element 131 test is unsatisfied, execution branches to decision element 134. Decision element 134 tests if the PP value is <15%, which if true suggests that the pig 20a has backed off the scale. In this case, the activity element 142 instructions are executed, resetting HPW=0, ST=0, and the IF to the first value causing inlet gate 40 to open. Resetting these values causes the Animal Capture routine to re-execute from the very beginning.

If the PP value is ≧15%, execution branches to decision element 138. Decision element 138 tests whether the current SW value≦the previous SW value. If true, this means that a pig 20a has been completely on weighing platform 42 for at least two executions of the Animal Capture routine. Execution then branches to the Capture Weight routine at connector 170 for recording the pig 20a weight. If SW>the previous SW value, SW is still increasing and the Animal Capture routine is re-executed.

Figure 7A:
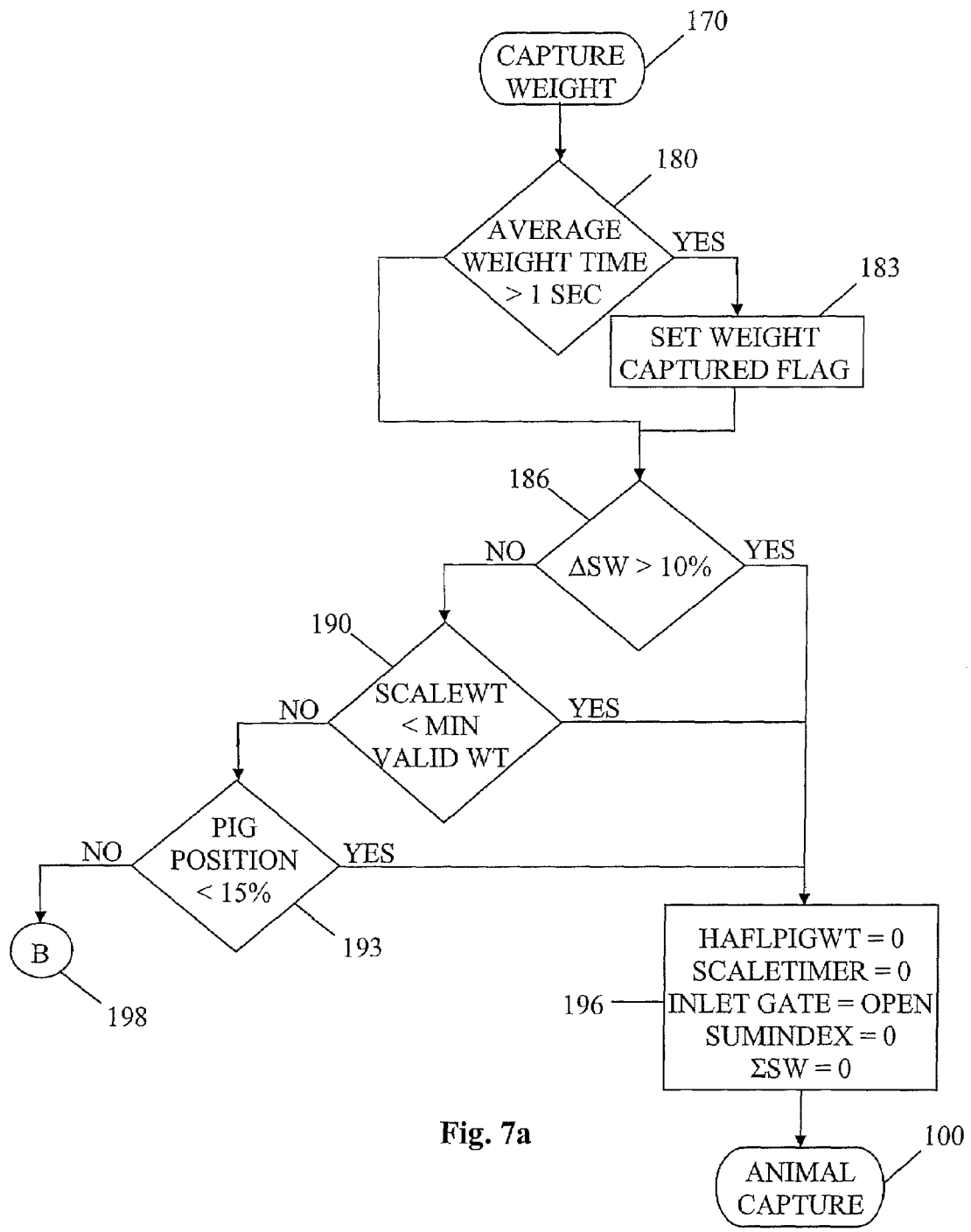
FIGS. 7a and 7b show a flowchart of software whose execution by a microprocessor or other computer forms part of a platform status element that tests animal weight and sets a flag verifying that the weight sensed for the animal is likely to be accurate.
Figure 7B:
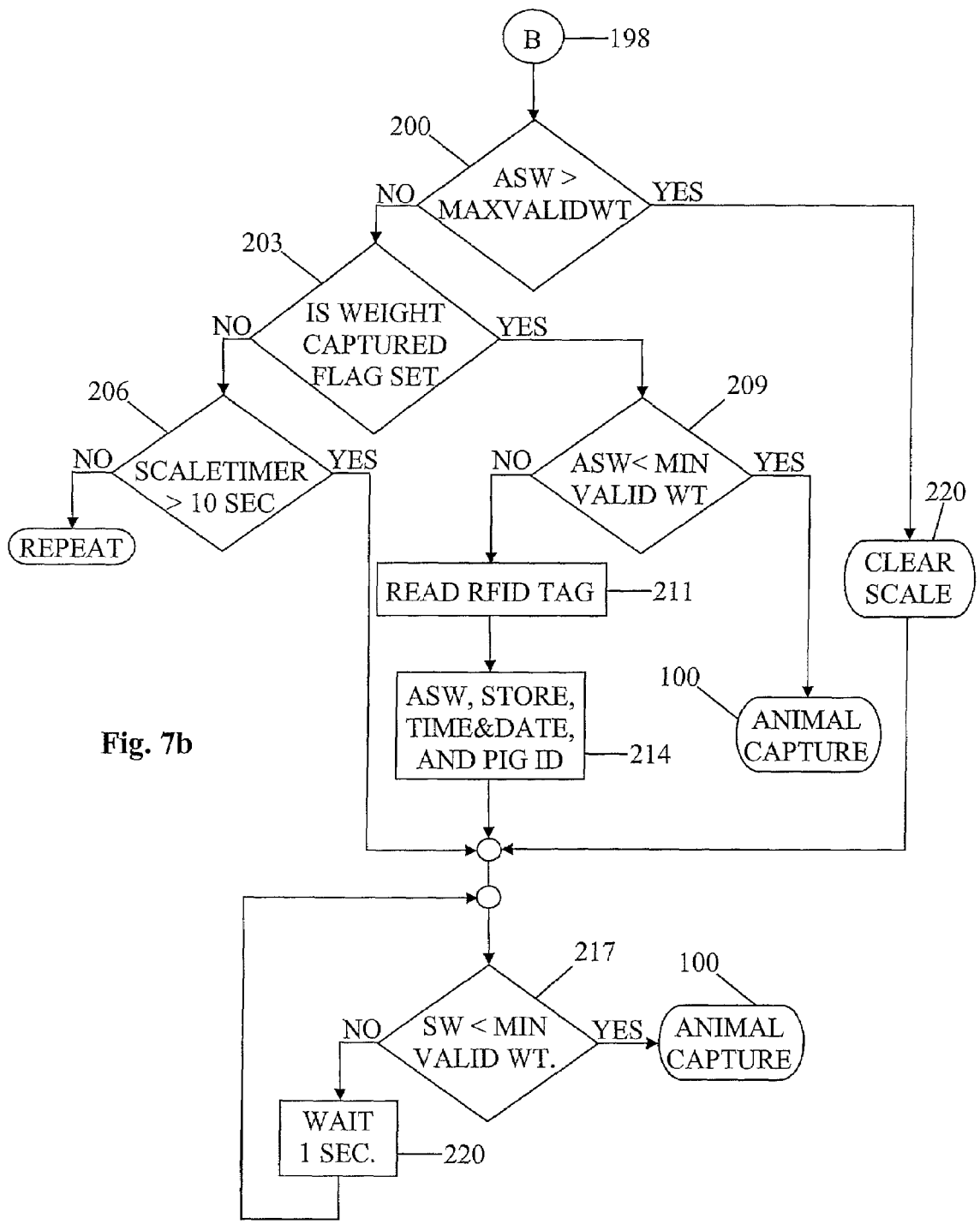

FIGS. 7a and 7b are the flowcharts for the Capture Weight routine, which verifies that the weight determined is likely to accurately measure the actual weight of the pig 20a on weighing platform 42.

First, decision element 180 tests whether the AWT value is >1 sec. If true, then the pig 20a, etc. has been on the scale for at least 1 sec. This means that an adequate number of SW values have been acquired to provide a good approximation of the pig 20a weight. In addition, the tests forming a part of the Animal Capture routine have all been satisfactorily passed, meaning that ASW is an accurate value for the actual pig 20a weight.

To indicate that ASW accurately reflects the actual pig 20a weight, the Weight Captured flag previously cleared by activity element 162, is set by activity element 183. Then regardless of the AWT value, decision element 186 is executed.

Decision element 186 tests whether ASW is greater than 10%. If so, this suggests that an indeterminate error has occurred in acquiring either the current values of $W_i$ and $W_e$ or the previous values of $W_i$ and $W_e$. In this case, the instructions of activity element 196 are executed, which set HPW, ST, SI, and ΣSW values to 0 and set the IF to the first value, opening the inlet gate 40.

If ΔSW is ≦10%, decision element 190 is executed next, which test whether SW is <MVW. If so, this means that the value calculated for the current value of SW is below the operator-selected minimum pig weight, and the instructions of activity element 196 are executed.

Next, decision element 193 tests whether PP value <15%. If so, the pig 20a has backed off the weighing platform 42, so the Animal Capture routine must be run again, and the instructions of activity element 196 are executed. If all of these tests are passed, then instruction execution passes through connector element B 198 to decision element 200 on FIG. 7b.

Decision element 200 tests whether the ASW value>an operator-entered Maximum Valid Weight. If true, a problem has occurred in acquiring the pig 20a weight, and instruction execution transfers to decision element 217.

If the ASW value is ≦Maximum Valid Weight, then decision element 203 tests whether the Weight Captured flag is now set. If so, then the instructions of decision element 209 are executed.

Decision element 209 tests whether the ASW value<the Minimum Valid Weight. If so, the ASW acquired cannot be trusted to be accurate, and execution transfers to the Animal Capture routine to begin another attempt to weigh a pig 20a.

On the other hand, if the ASW value has been found to fall within the weight range bounded by the Minimum and Maximum Valid Weight values and the Captured weight flag is set, then the ASW value can be stored. The RFID tag is read by activity element 211 and is stored by activity element 214 along with the ASW and any other pertinent data in memory 62. Element 214 forms a second weight recorder. Typically, the weight data will eventually be transferred to another computer in some way for further evaluation.

If the Weight Captured flag is not set, then decision element 203 transfers instruction execution to decision element 206, which tests the value of the ST. If ST>10 sec., then the pig 20a has been on the weighing platform 42 for too long, and the instructions of decision element 217 are executed next.

If the Weight Captured flag is set, then decision element 203 transfers instruction execution back to the start of the Capture Weight routine at connector element 170.

Decision element 217 tests whether SW<Minimum Valid Weight. If so, this means the pig 20a has stepped off the weighing platform 42 and another pig 20a can be weighed when the opportunity presents itself. If SW≧Minimum Valid Weight, then activity element waits one second and again executes decision element 217.

Frequently, pig 20a will stand with all four hooves on weighing platform 42 for at least 1 sec. to allow ΣSW to be acquired and a valid ASW available. If this turns out to be only occasionally true, then the exit gate 41 shown in FIG. 1a may be necessary to allow adequate number of weight acquisitions over a set time. This will require additional logic to open and close exit gate 41. In general, this logic will require exit gate 41 to close when the front hoof of a pig 20a is first detected on weighing platform 42, and then to open when a valid ASW is acquired.

The invention claimed is:

1. An animal weighing system for use in a pen containing a plurality of quadruped animals, said pen having at least first and second segregated spaces with a first one-way chute allowing animal passage from the second space to the first space, comprising
   a) a passage having an entrance and an exit, said passage allowing animal passage from the first space to the second space;
   b) a weighing station within the passage, said weighing station including i) a weighing platform within the passage and forming a part of the platform and over which an animal must pass when passing from the first to the second space, said weighing platform having inlet and exit ends adjacent to the first and second spaces respectively, ii) an inlet scale supporting the weighing platform adjacent to the inlet end thereof, and periodically providing an inlet weight signal encoding a value indicating the weight supported by the inlet scale, and iii) an exit scale supporting the weighing platform adjacent to the exit end thereof and periodically providing an exit weight signal encoding a value indicating the weight supported by the exit scale; and
   c) a controller receiving the inlet and exit weight signals and comprising i) a memory, ii) a calculation element receiving and recording the inlet and exit weight signals in the memory, calculating and recording in the memory a scale weight value equal to the sum of values encoded in at least one inlet weight signal and at least one exit weight signal, and iii) a platform status element periodically executing an algorithm determining from the values encoded in the inlet and exit weight signals the presence of a single animal on the weighing platform, and responsive to said determination issuing a weight captured signal signifying that the recorded scale weight value accurately specifies the weight of the animal on the scale.

2. The weighing system of claim 1, wherein the calculation element periodically computes the scale weight value as the sum of the current inlet and exit weight values, and a position value as a function of the inlet and exit weight values, and wherein the platform status element issues the weight captured signal responsive to at least one of i) at least one increase in successive inlet weight values, ii) the position value having a predetermined relationship to a predetermined value, and iii) the position value having a predetermined relationship to a trigger table recorded in the memory relating animal length to the sum of the inlet and exit weight values.

3. The weighing system of claim 1, wherein the memory includes a trigger table having entries based on weight and length measurements of a sample of quadruped animals of the type to be contained in the pen, wherein the calculation element periodically computes a scale weight as the sum of the current inlet and exit weight values, and a position value as a function of the inlet and exit weight values, and wherein the platform status element issues the weight captured signal responsive to at least one of i) at least one increase in successive inlet weight values, ii) the position value having a predetermined relationship to a predetermined value, and iii) the position value having a predetermined relationship to the trigger table recorded in the memory.

4. The weighing system of claim 3, wherein the passage includes an inlet gate respectively opening and closing responsive to first and second values of an inlet gate signal, and wherein the platform status element further issues the weight captured signal responsive to at least one of i) the first value of the inlet gate signal and the current value of the scale weight exceeding the previous value of the scale weight, and ii) the current value of the scale weight being a predetermined percentage of the previous value of the scale weight.

5. The weighing system of claim 4, wherein the platform status element further includes an element issuing the inlet gate signal with a second value responsive in part to one of i) the current value of the scale weight being a predetermined percentage of the previous value of the scale weight and ii) the position value having a predetermined relationship to the trigger table.

6. The weighing system of claim 3 wherein the platform status element further includes an element issuing the weight captured signal responsive in part to the inlet gate signal having the second value and at least one of i) the position value exceeding a predetermined value, and ii) the current scale weight being less than the previous scale weight.

7. The weighing system of claim 3 wherein the calculation element computes the position value as: at least one of the inlet weight and the exit weight divided by the scale weight.

8. The weighing system of claim 7 including a tag reader mounted adjacent to the passage for reading identification information recorded in a tag affixed to an animal within the passage and providing in an identification signal, information recorded in the tag, wherein the controller receives the identification signal, and records in the memory in association with the scale weight signal, the identification information in the identification signal.

9. The weighing system of claim 1 including a tag reader mounted adjacent to the passage for reading identification information recorded in a tag affixed to an animal within the passage and providing in an identification signal, information recorded in the tag, wherein the controller receives the identification signal, and records in the memory in association with the scale weight signal, the identification information in the identification signal.

* * * * *